United States Patent [19]

Boyd et al.

[11] Patent Number: 5,535,555
[45] Date of Patent: Jul. 16, 1996

[54] BREAKAWAY POST COUPLING

[75] Inventors: Steven D. Boyd, Palo Cedro; Randy W. Akana, Chico, both of Calif.

[73] Assignee: The University Foundation, California State University, Chico, Calif.

[21] Appl. No.: 560,282

[22] Filed: Nov. 17, 1995

[51] Int. Cl.$^6$ ..................................................... B04C 1/00
[52] U.S. Cl. .................. 52/99; 52/298; 52/726.1; 403/305; 403/2; 248/548; 248/900; 404/10
[58] Field of Search ..................... 52/98, 99, 100, 52/104, 296, 297, 298, 704, 726.1; 248/548, 900; 403/305, 2; 404/9, 10; 40/607, 608

[56] References Cited

U.S. PATENT DOCUMENTS

| | | |
|---|---|---|
| 1,378,948 | 5/1921 | Hage . |
| 1,553,785 | 9/1925 | Ley . |
| 2,954,638 | 10/1960 | Motter . |
| 3,628,296 | 12/1971 | Henry . |
| 3,762,674 | 10/1973 | Ortega . |
| 3,912,404 | 10/1975 | Katt .............................................. 403/2 |
| 4,133,154 | 1/1979 | Ruzicka . |
| 4,553,358 | 11/1985 | Deike . |
| 4,588,157 | 5/1986 | Mills . |
| 4,644,713 | 2/1987 | Lehman . |
| 4,759,161 | 7/1988 | Kucyk, Jr. et al. ......................... 52/99 |
| 4,793,110 | 12/1988 | Tucker . |
| 4,896,992 | 1/1990 | Muhlethaler ....................... 52/726.1 X |
| 4,926,592 | 5/1990 | Nehls . |
| 5,214,886 | 6/1993 | Hugron ..................................... 52/98 |

*Primary Examiner*—Carl D. Friedman
*Assistant Examiner*—Creighton Smith
*Attorney, Agent, or Firm*—John P. O'Banion

[57] ABSTRACT

A breakaway post coupling with a hollow, tubular sleeve which accomodates a ground-mounted stub post and a top, sign-supporting post. The sleeve is held onto the posts by a plurality of pins which engage a corresponding plurality of slots in the sleeve. Collars slidably engage the sleeve and force the pins into the post material as the collars are drawn over the sleeve and pins. A plurality of cutouts in the sleeve define a shear point in the coupling. When the top post is struck by a vehicle, the coupling breaks at the shear point, leaving an intact stub post upon which a new top post can be joined.

12 Claims, 5 Drawing Sheets

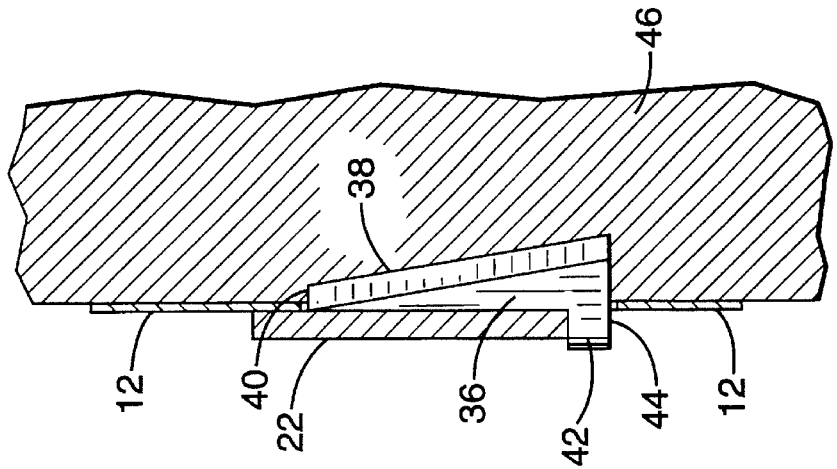
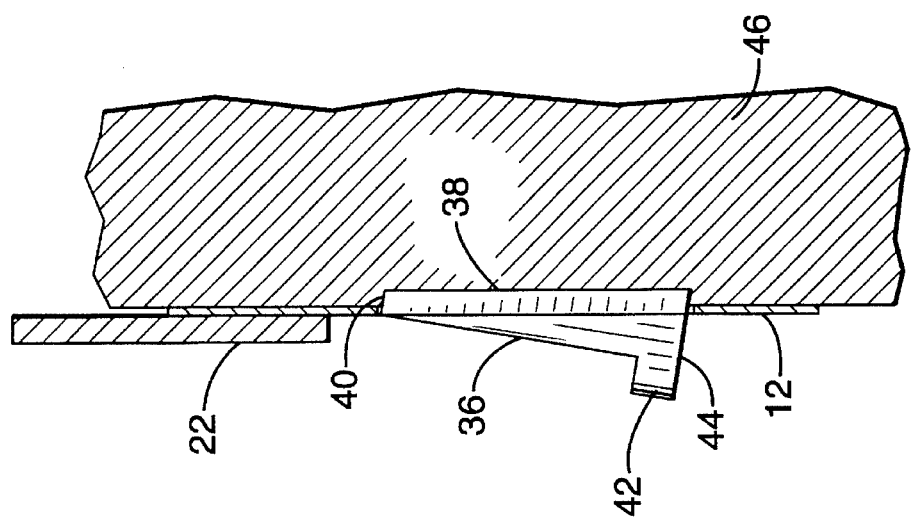
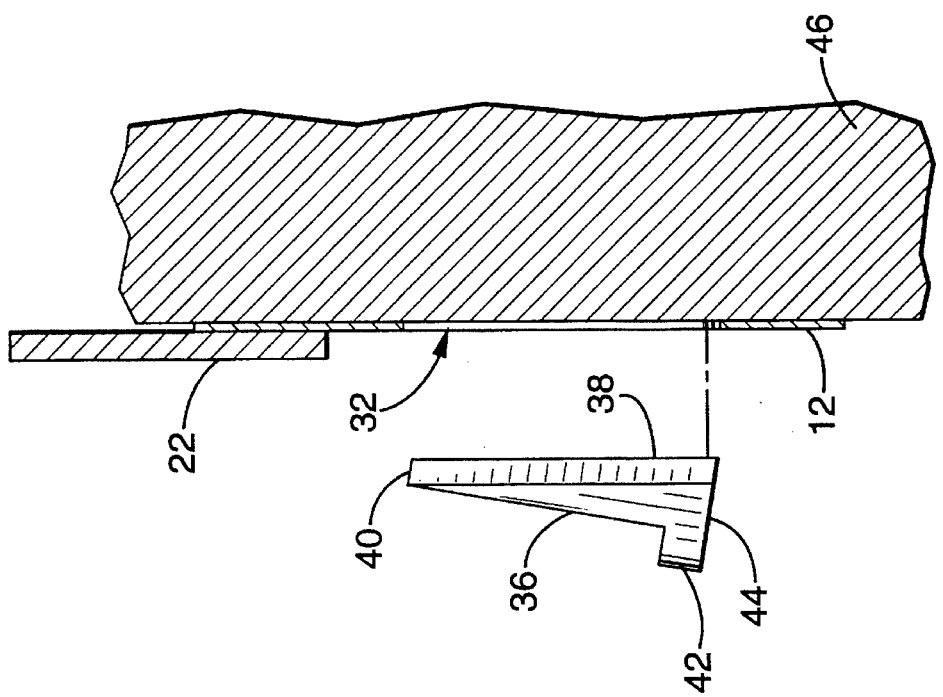

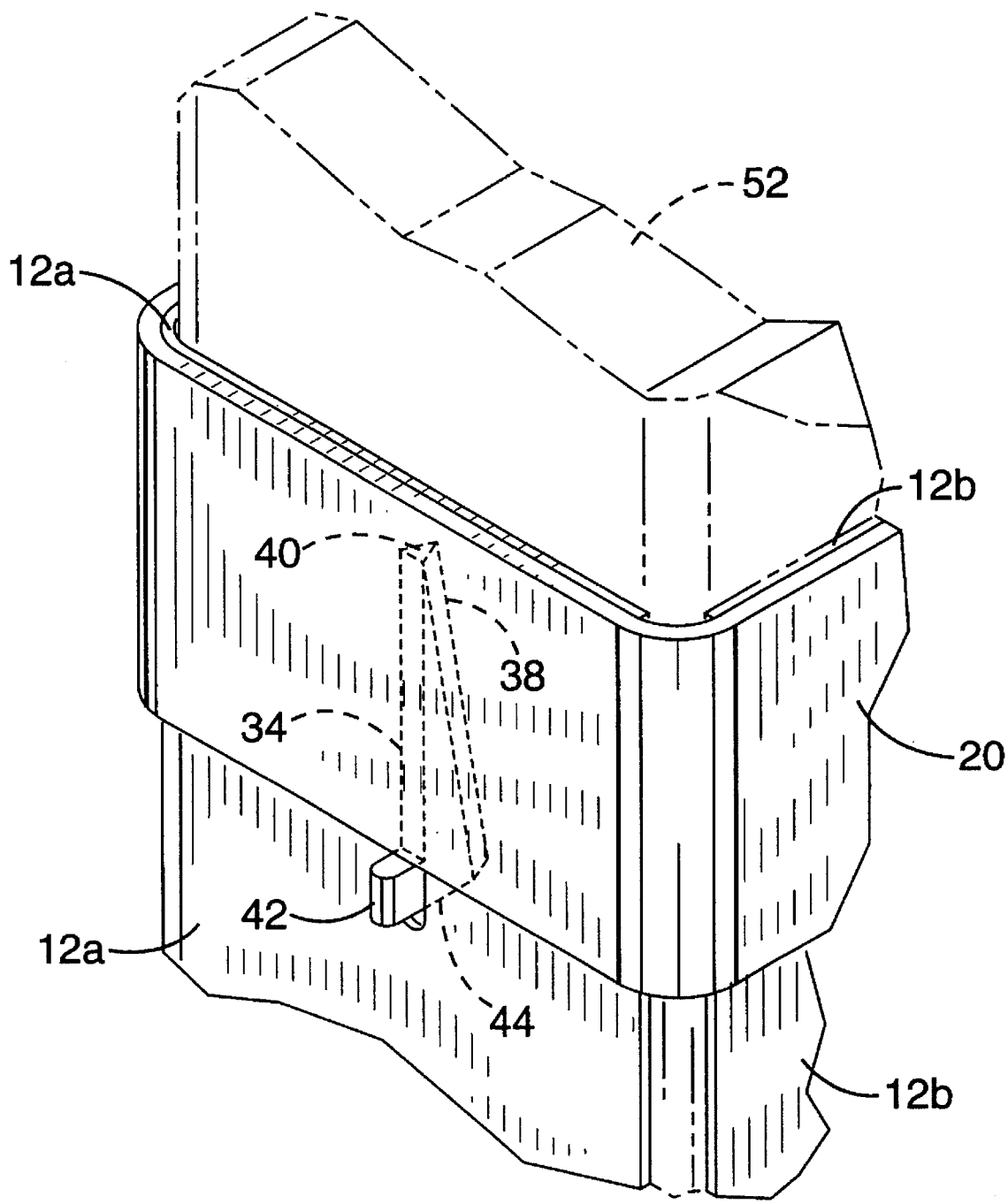
FIG. — 4

BREAKAWAY POST COUPLING

BACKGROUND OF THE INVENTION

1. Field of the Invention

This invention pertains generally to couplings, mountings and joints for posts, barriers, and support structures, and more particularly to a coupling which, upon impact by a vehicle, breaks away at a desired location to leave an intact post stub upon which another post may subsequently be mounted.

2. Description of the Background Art

A variety of temporary and permanent signs, warning lights, barriers, and like structures are employed in association with roadways to identify hazards and provide location information to motorists, as well as to prevent entry of vehicles into restricted or dangerous areas. Posts and other vertical supports are generally mounted in the ground by means of filled post holes wherein a hole is excavated, a post is mounted within the hole, and the hole is subsequently filled with concrete or other material to support the post.

Signs and barriers along roadways are often impacted by motor vehicles which cause damage to the supporting posts. Such collisions also generally result in damage to the vehicle and, further, may cause serious injury to occupants of the vehicle. Replacement of damaged or broken posts due to such collisions is often a difficult and expensive operation. Many posts used in supporting signs and the like are made of pressure and/or chemical-treated wood which is considered to be a hazardous material in many states. The broken or damaged portion of such posts cannot be left in the ground, but must be removed even when broken off below the ground level. Such removal generally requires extraction of the concrete fill from the post hole, or excavation of the area surrounding the post. Once removed, the damaged posts and portions thereof must then be disposed of in special landfills. Often the cost associated with disposal of damaged posts in special landfills is greater than the cost of the posts themselves.

Couplings and joints for posts which break away upon impact have been developed in response to the aforementioned problems. For example, a common solution is to use a lower, ground mounted post and an upper, sign-supporting post which are coupled together at two facing horizontal plates by a plurality of bolts. Upon collision with a vehicle, the bolts break and the upper and lower posts separate at the facing horizontal plates. An alternative frangible coupling arrangement comprises perforated tubular posts which slidably engage a perforated tubular sleeve, with bolts extending through the perforations to couple the posts to the sleeve.

Supports and anchors for temporary or removable posts are also known. These supports and anchors typically employ a ground-mounted collar or socket that accommodates a post which can be removed from the support and replaced when damaged or broken by impact with a motor vehicle.

As can be seen therefore, a number of breakaway post couplings and removable post arrangements have previously been employed. Some important deficiencies, however, are present in the available post couplings which are designed to break upon impact. For example, conventional breakaway coupling systems for posts rely on arrangements of parts which are held together by a plurality nuts and bolts, and replacement of the couplings after breakage is difficult and time consuming due to re-attachment of the plurality of bolts and nuts. Further, the portion of the lower or ground-mounted post which accommodates the bolts may become bent, stripped, or otherwise damaged by a collision so that attachment of a new post thereon is difficult or impossible, and thus the ground mounted post still may have to be removed and replaced. Similarly, the available ground mounted supports for removable posts are also subject to bending or other damage from vehicle collisions with the removable post, thus requiring removal and replacement of the support in order to replace the post.

Accordingly, there is a need for a breakaway post coupling which can quickly and easily be replaced in the event of breakage due to a collision, and which does not employ bolts or other parts which may become bent or stripped by the force of a collision such that replacement of the coupling is difficult or impossible. The present invention satisfies these needs, as well as others, and generally overcomes the deficiencies found in the background art.

The foregoing reflects the state of the art of which the applicant is aware and is tendered with the view toward discharging applicant's acknowledged duty of candor in disclosing information which may be pertinent in the examination of this application. It is respectfully stipulated, however, that none of the aforementioned background art teaches or renders obvious applicant's claimed invention.

SUMMARY OF THE INVENTION

The present invention provides a breakaway coupling for signposts, fenceposts, telephone poles, barriers, and like structures which may accidentally be hit by vehicles, or intentionally run over by vehicles during an emergency to gain access to a blocked area. In general terms, the invention comprises a hollow, tubular sleeve having a plurality of apertures which define a frangible portion or shear point in the sleeve, and upper and lower collars which hold the sleeve onto a pair of posts which are coupled together. A plurality of tapered pins fit through a plurality of corresponding slots in the sleeve to engage each of the coupled posts, and the collars are slidably forced over the sleeve and pins to push the pins into the posts.

By way of example and not of limitation, the sleeve preferably comprises first and second sleeve sections which are brought together to form the hollow, tubular sleeve. The plurality of apertures preferably have inwardly bent flanges which form a barrier or separating point which separates the posts joined or coupled together by the sleeve, with the barrier being generally adjacent to the shear point. The sleeve may be of a rectangular, cylindrical, triangular or other shaped cross section, to accommodate posts of various shapes. The slots for the tapered pins are preferably included on both upper and lower portions of the sleeve, and are preferably elongated in shape and oriented in a longitudinal or vertical fashion so that vertical sliding of the collars over the sleeve drives the pins into the posts.

The breakaway coupling of the invention is used by engaging the lower end of the sleeve with a base or stub post that is mounted in the ground or which will subsequently be mounted in the ground. Tapered pins are then positioned in the slots in the lower portion of the sleeve, and the lower collar is drawn or forced downward over the sleeve and the tapered pins, driving the pins into the stub post and securing the sleeve to the stub post. A second or top post is then engaged in the upper end of the sleeve, and the stub post and top post are arranged within the sleeve so that they abut the barrier defined by the cutouts, adjacent to the shear point of the sleeve. A plurality of pins are positioned in the corresponding plurality of slots in the upper portion of the sleeve, and the upper collar is then drawn or forced downward over the sleeve and pins to drive the pins into the top post, thereby securing the sleeve to the top post and effectively coupling the stub post and top post together.

The stub post and top post thus joined together may be used to support a sign or other vertically mounted structure, with the sign or other structure being mounted on the top post. When supporting such a structure, the breakaway coupling is preferably positioned to be below the likely point of impact by a motor vehicle, so that a motor vehicle, in the event of a collision, will strike the top post above the coupling. Preferably, the top of the stub post and the shear point of the coupling will be generally adjacent to the ground level. Upon impact, the coupling will break or shear at the shear point defined by the cutouts in the sleeve, leaving the stub post intact and thereby preventing the need for digging out and replacing the stub post. The sign or other structure can then be easily replaced by removing the broken portion of coupling from the ground-mounted stub post and then fitting another sleeve onto the stub post and another top post within the new sleeve, with pins and collars used as described above to couple the new top post to the stub post.

An object of the invention is to provide a breakaway post coupling that eliminates the need for digging up and replacing posts which have been damaged by impact with a vehicle.

Another object of the invention is to provide a breakaway post coupling which is quick and easy to install and replace.

Another object of the invention is to provide a breakaway post coupling which is simple and inexpensive to manufacture.

Another object of the invention is to provide a breakaway post coupling which may be used with a variety of post materials without requiring modification of the posts.

Further objects of the invention will be brought out in the following portions of the specification, wherein the detailed description is for the purpose of fully disclosing the invention without placing limits thereon.

BRIEF DESCRIPTION OF THE DRAWINGS

The invention will be more fully understood by reference to the following drawings which are for illustrative purposes only:

FIG. 3A through FIG. 3C is a diagrammatic sectional view illustrating the manner in which the pins of the breakaway coupling are driven into a post as a collar is drawn over the sleeve.

FIG. 4 is a perspective view of the upper collar shown positioned over the sleeve and a pin of the breakaway coupling.

DESCRIPTION OF THE PREFERRED EMBODIMENTS

Referring more specifically to the drawings, for illustrative purposes the present invention is embodied in the breakaway post coupling apparatus which is generally shown in FIG. 1 through FIG. 4. It will be appreciated that the apparatus may vary as to configuration and as to details without departing from the basic concepts as disclosed herein.

Figure 1:
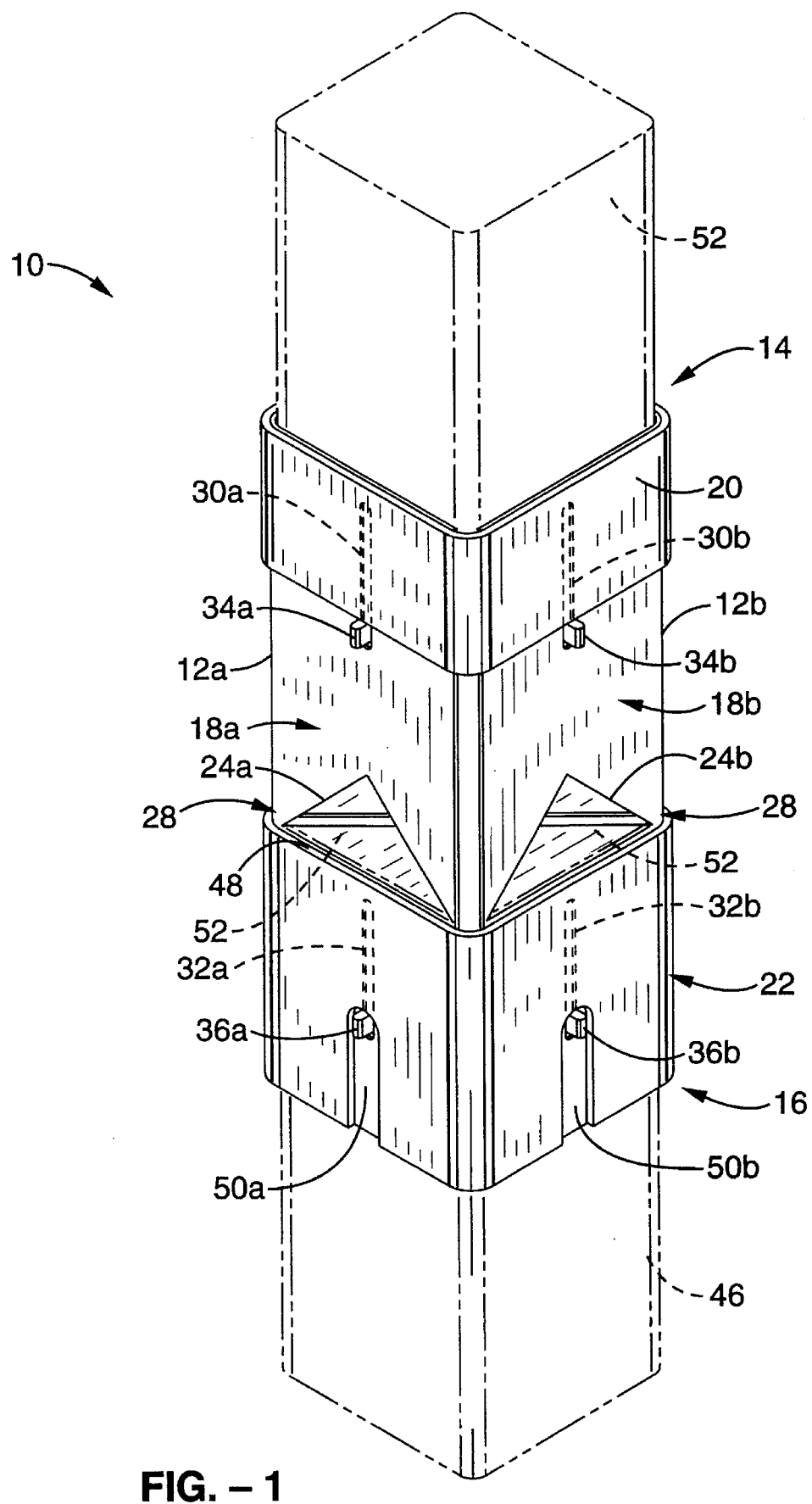
FIG. 1 is a perspective view of a breakaway coupling in accordance with the present invention shown a stub post and a top post.
Figure 2A:
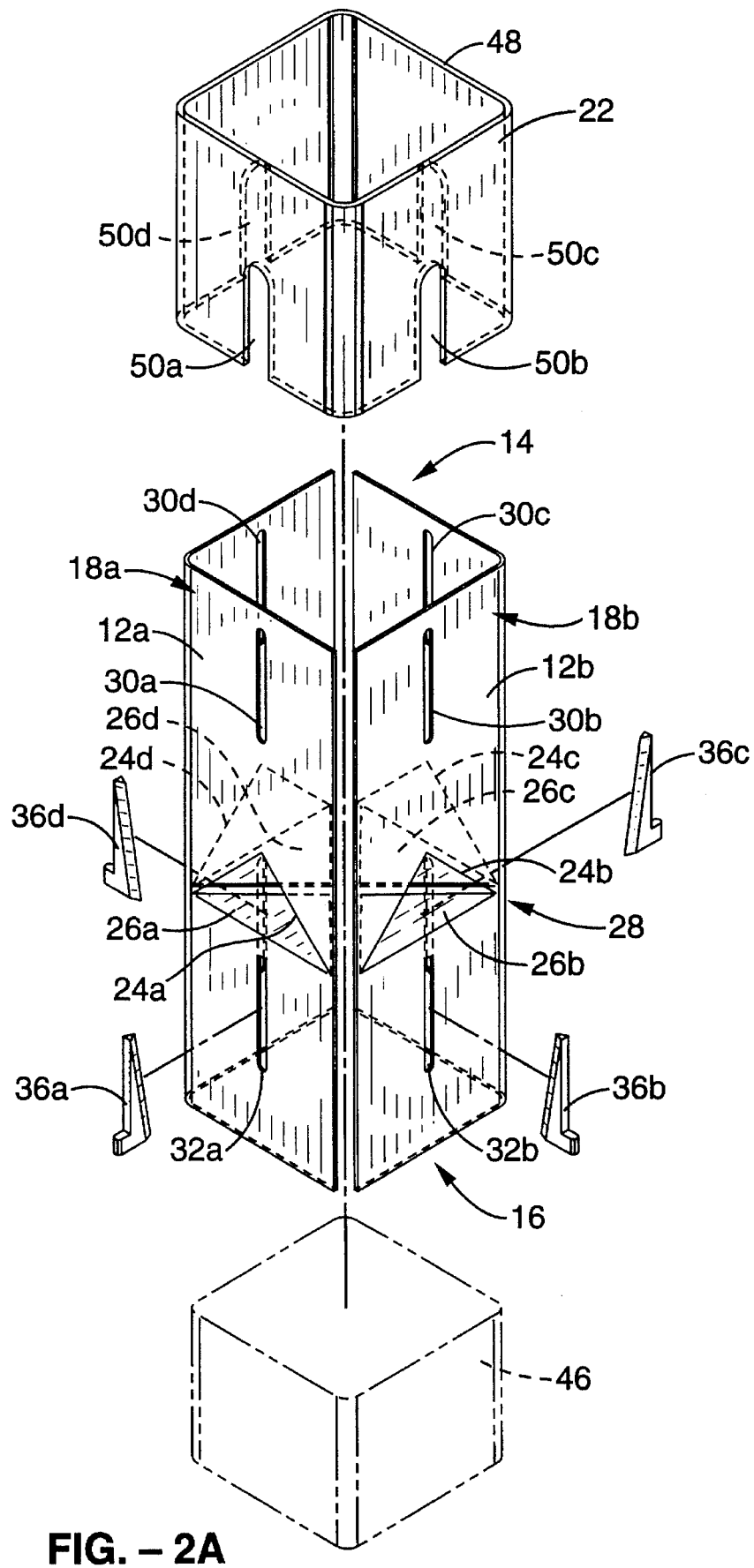
FIG. 2 is an exploded view of the breakaway coupling of FIG. 1 illustrating attachment of the invention to a stub post.
FIG. 2B is an exploded view of the breakaway coupling of FIG. 1 illustrating attachment of the invention to a top post.
Figure 2B:
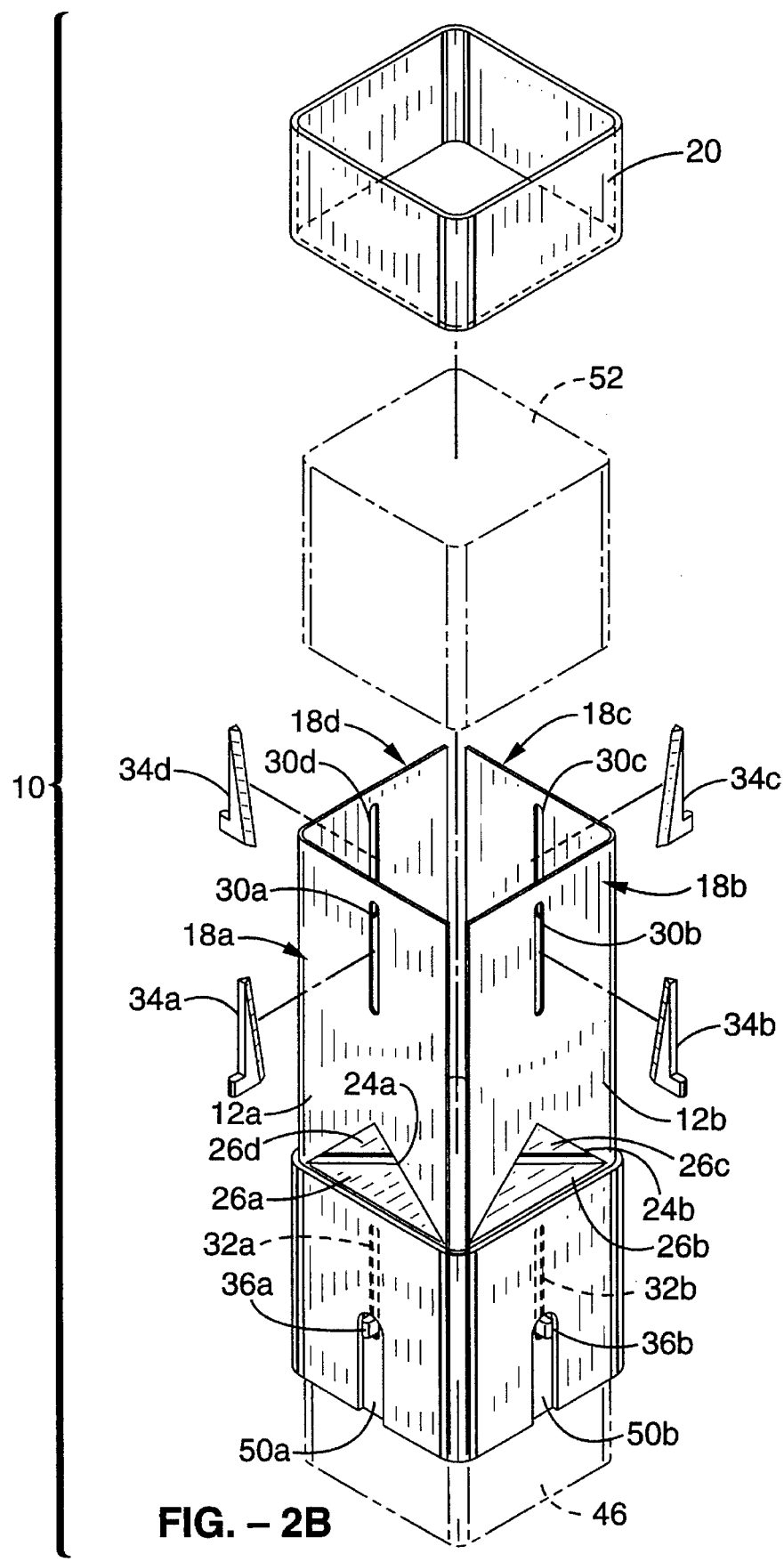

Referring first to FIG. 1, FIG. 2A, and FIG. 2B, there is shown a breakaway post coupling 10 in accordance with the present invention is shown. The breakaway post coupling 10 includes an elongated, hollow, tubular sleeve 12. Preferably, sleeve 12 comprises first and second elongated sleeve parts or members 12a, 12b, as can be seen in FIG. 2A and FIG. 2B. Sleeve members 12a, 12b fit together to form or define sleeve 12. Sleeve 12 includes an upper end 14, and a lower end 16, and is structured and configured to accommodate standard, commercially available posts which are used for supporting road signs or other roadside structures. As shown in FIG. 2A and FIG. 2B, sleeve 12 is of generally square cross section, with four sides 18a–18d. Sleeve members 12a, 12b thus have a generally "L"-shaped cross section, to provide the square cross section to sleeve 12 when sleeve members are brought together. The square configuration fits standard "4 by 4" pressure-treated posts which are used for supporting signs and the like. However, sleeve 12 may alternatively have a circular cross section to accommodate cylindrical posts, or may be configured to fit triangular posts or posts of all different shapes and sizes.

The breakaway post coupling 10 also comprises a first or upper collar 20, and a second or lower collar 22, with upper and lower collars 20, 22 structured and configured to slidably engage or fit over sleeve 12. Upper collar 20 is positioned adjacent the upper end 14 of sleeve 12, and lower sleeve 22 is positioned over the lower end 16 of sleeve 12, as described below in more detail. Upper and lower collars 20, 22 are shown with a generally square cross section to fit over a sleeve of square cross section. As with sleeve 12, however, collars 20, 22 may be of different shapes and sizes for use with different types of posts.

Sleeve 12 includes a plurality of apertures 24a–24d positioned laterally about sleeve 12. In the preferred embodiment, there are four such apertures 24a–24d, with one such aperture included on each side 18a–18d of sleeve 12. Apertures 24a–24d are preferably triangular in shape as shown, and are formed by cutting or punching out the sides of the triangle and bending the triangular portion inward at its base toward the center of sleeve 12, thereby also forming triangular-shaped flanges 26a–26d in sleeve 12, as can be seen in FIG. 2A and FIG. 2B. The plurality of apertures 24a–24d define shear points 28 at the corners of sleeve 12 which serve as the break points for the breakaway post coupling 10, as described further below. While apertures 24a–24d are shown as triangular in shape, it is also contemplated that square, rounded, or other shaped apertures may be employed with the invention, although it has been found that shear reaction is enhanced by using triangular-shaped apertures where the shear points are in the areas between the corners of the triangles.

A plurality of slots 30a–30d, 32a–32d are included in sleeve 12, with slots 30a–30d positioned adjacent sleeve upper end 14, and slots 32a–32d positioned adjacent sleeve lower end 16. Preferably, slots 30a–30d, 32a–32d are of a generally elongated shape and are oriented longitudinally or vertically with respect to sleeve 12.

Referring to FIG. 3A through FIG. 3C and FIG. 4 as well as FIG. 2A and FIG. 2B, the invention also comprises a plurality of pins 34a–34d, 36a–36d, which preferably are tapered in shape to provide generally triangular or wedgeshaped pins. Referring particularly to FIG. 3A through FIG. 3C and FIG. 4, each of the plurality of pins 34a–34d, 36a–36d preferably includes a sharpened or honed, inward facing edge 38, an upward pointing apex 40 and an outwardly disposed tab 42 adjacent to a base 44. Other shapes and types of pins, as well as slots structured and configured to accommodate such pins, are also contemplated for use with the present invention. The preferred tapered-shaped pins described above allow facile removal and replacement of the breakaway coupling in the event of a collision, as described below.

The preferred manner of using the breakaway coupling 10 comprising the invention is illustrated in FIG. 2A through FIG. 3C. A lower or stub post 46, which is mounted in the ground or will subsequently be mounted in the ground, is inserted or fitted between sleeve members 12a, 12b so that stub post engages the lower end 16 of sleeve 12, as shown in FIG. 2A and 2B. The inwardly bent flanges 26a–26d in sleeve 12 form or define a barrier separating the upper and lower portions of sleeve 12, and stub post 46 is inserted into sleeve 12 until it abuts the barrier formed by flanges 26a–26d, as can be seen in FIG. 2B. Tapered pins 36a–36d are then positioned in slots 32a–32d, with sharpened edge 38 facing inward, apex 40 pointing upward, and tab 42 pointing outward, and base 44 pointing downward, as shown in FIG. 3A and FIG. 3B. Lower collar 22 is then fitted over sleeve upper end 14 and slid downward over sleeve 12 until lower collar 22 reaches the tapered pins 36a–36d, at which point the lower collar 22 is forced or drawn over the tapered pins 36a–36d, driving the pins into stub post 46 through slots 32a–32d, as shown in FIG. 3A through FIG. 3C. The tabs 42 on pins 36a–36d prevent lower collar 22 from completely sliding downward over the pins and off of sleeve 12. Collar 22 holds tapered pins 36a–36d securely into stub post 46 even though pins 36a–36d do not penetrate deeply into the post material, thus allowing for easy removal of the pins once collar 22 is removed from sleeve 12.

Since the stub post is to be protected from breakage in the event of a collision with a vehicle, the lower collar 22 preferably comes to rest against protrusions 42 of pins 36a–36d in a position such that the upper edge 48 of lower collar 22 is located adjacent to the shear point 28 of sleeve 12, thus reinforcing the breakaway coupling 10 below the shear point 28 and insuring that the coupling 10 will break at the shear point 28. Downward facing slots or channels 50a–50d may be included in lower collar 22, to allow collar 22 to slide further downward relative to protrusions 42, and allowing use of a longer lower collar 22, thereby providing more reinforcement below the shear point 28 and thus more protection from breakage to the stub post 46.

Once sleeve 12 is thus secured to stub post 46, an upper or top post 52 is then fitted or inserted between sleeve members 12a, 12b so that top post 52 engages the upper end 14 of sleeve and abuts the barrier formed by flanges 26a–26d. Tapered pins 34a–34d are positioned in slots 30a–30d, with sharpened edge 38 facing inward, apex 40 pointing upward, base 44 facing downward, and tab 42 pointing outward as described above. Upper collar 20 is then slid downward over sleeve 12, and drawn or forced over pins 34a–34d to secure the breakaway coupling 10 to top post 52. Protrusions 42 on pins 34a–34d prevent upper collar 20 from sliding further downward.

The assembled breakaway post coupling 10 joining a stub post 46 and a top post 52 together is shown in FIG. 1. The stub post 46 and top post 52 thus joined by the breakaway coupling 10 can be used to support a sign or other structure. The stub post 46 and top post 52 may be joined together with breakaway coupling 10 after stub post 46 has been mounted in the ground, or stub post 46 and top post 52 may be joined together first, and stub post 46 subsequently mounted in the ground. The breakaway coupling 10 is preferably positioned relative to stub post 46, top post 52, and the ground (not shown) so that coupling 10 is below the likely point of impact by a vehicle, with top post 52 positioned to receive the impact. Preferably, the top of the stub post, and thus the shear point 28 of sleeve 12 in breakaway coupling 10, is positioned generally adjacent to the ground level, to further protect the stub post from damage resulting from a collision.

In the event of a collision, the breakaway coupling 10 yields at the shear point 28 of sleeve 12, and sleeve 12 is broken away at the shear point 28. The upper collar 20 and the portion of sleeve 12 above the shear point 28 are retained on the top post 52, and the portion of sleeve 12 below shear point 28 and lower collar 22 remains on the intact stub post after the collision. The existing top post or a new top post can then be joined to the stub post 46 by sliding lower collar 22 upward off of the remaining portion of sleeve, and removing pins 36a–36d so that the damaged sleeve portion can be disengaged from stub post 12. The tapered shape of the pins permits only shallow penetration into the post material and thus provide for easy removal of the pins from the posts. Then, the top post can be joined to the stub post 46 in the manner described above. The original upper and lower collars 20, 22, and tapered pins 34a–34d, 36a–36d may be re-used, as well as the original top post 52, if undamaged by the collision.

The components of the breakaway coupling 10 are preferably made of steel or other metal or metal alloys, plastic composites, or the like. Preferably, the sleeve members 12a, 12b are made of a thinner gauge material, while the collars 20, 22 are made of a heavier gauge material, to provide additional protection to the stub post 46 and more clearly define the shear point 28 in sleeve 12.

While the breakaway coupling comprising the present invention has been described in terms of vertical posts to provide vertical support to signs and the like, it should be readily apparent to persons of ordinary skill in the art that the invention may also be used with horizontally oriented support structures. For example, horizontal support members in a barricade can employ the breakaway post coupling 10 to minimize damage and facilitate replacement of broken parts. Sleeve 12 and collars 20, 22 can also be structured and configured for use with railroad crossing guard arms, or guard arms at check points and parking lots.

Accordingly, it will be seen that the present invention provides a breakaway coupling for use with road signs, roadside lights and barriers, and other structures which eliminates the need for digging up and replacing posts which have been damaged by impact with a vehicle, which is quick and easy to install and replace, and which is simple and inexpensive to manufacture. Although the description above contains many specificities, these should not be construed as limiting the scope of the invention but as merely providing illustrations of some of the presently preferred embodiments of this invention. Thus, the scope of the invention should be determined by the appended claims and their legal equivalents.

What is claimed is:

1. A breakaway post coupling, comprising:

(a) a hollow, tubular sleeve, said sleeve including a plurality of apertures, said apertures defining a shear point in said sleeve, said sleeve including a plurality of slots;

(b) a plurality of tapered pins, said slots accommodating said tapered pins;

(c) an upper collar, said upper collar slidably engaging said sleeve; and (d) a lower collar, said lower collar slidably engaging said sleeve.

2. A breakaway post coupling as recited in claim 1, further comprising a plurality of inwardly bent flanges adjacent said apertures, said flanges defining a barrier in said sleeve.

3. A breakaway post coupling as recited in claim 2, wherein said apertures and said flanges are triangular-shaped.

4. A breakaway post coupling as recited in claim 1, wherein said sleeve comprises a first sleeve member and a second sleeve member, said sleeve members fitting together to form said sleeve.

5. A breakaway post coupling, comprising:

(a) a hollow, tubular sleeve, said sleeve including an upper end and a lower end, said sleeve including a plurality of longitudinal slots;

(b) a plurality of tapered pins, said pins engaging said slots;

(c) said sleeve including a plurality of apertures, said apertures defining a shear point in said sleeve;

(d) an upper collar, said upper collar slidably engaging said sleeve; and (e) a lower collar, said lower collar slidably engaging said sleeve.

6. A breakaway post coupling as recited in claim 5, wherein said plurality of longitudinal slots comprises a first plurality of slots positioned adjacent said upper end of said sleeve and a second plurality of slots positioned adjacent said lower end of said sleeve.

7. A breakaway post coupling as recited in claim 5, further comprising a plurality of inwardly bent flanges adjacent said apertures, said flanges defining a barrier in said sleeve.

8. A breakaway post coupling as recited in claim 7, wherein said apertures and said flanges are triangular-shaped.

9. A breakaway post coupling as recited in claim 5, wherein said sleeve comprises a first sleeve member and a second sleeve member, said sleeve members fitting together to form said sleeve.

10. A breakaway post coupling, comprising:

(a) a hollow tubular sleeve having upper and lower ends, said sleeve including a first plurality of slots positioned adjacent said upper end and a second plurality of slots positioned adjacent said lower end;

(b) a plurality of tapered pins, each pin including a honed edge, said pins received by said slots;

(c) said sleeve including a plurality of apertures, said apertures defining a shear point in said sleeve;

(d) said sleeve including a plurality of inwardly projecting flanges adjacent said apertures, said flanges defining a barrier inside said sleeve;

(e) an upper collar, said upper collar slidably engaging said sleeve; and (f) a lower collar, said lower collar slidably engaging said sleeve.

11. A breakaway post coupling as recited in claim 10, wherein said apertures and said flanges are triangular-shaped.

12. A breakaway post coupling, comprising:

(a) a first sleeve member and a second sleeve member, each of said sleeve members including an upper end and a lower end, said sleeve members fitting together to form a hollow, tubular sleeve, said each of said sleeve members including a first plurality of slots positioned adjacent said upper end, each said sleeve member including a second plurality of slots positioned adjacent said lower end;

(b) a plurality of tapered pins, each pin including a honed edge, said pins received by said slots;

(c) each of said sleeve members including a plurality of triangular-shaped apertures, said apertures defining a shear point in said sleeve member;

(d) each of said sleeve members including a plurality of triangular-shaped inwardly projecting flanges adjacent said apertures, said flanges defining a barrier inside said sleeve;

(e) an upper collar, said upper collar slidably engaging said sleeve; and (f) a lower collar, said lower collar slidably engaging said sleeve.

* * * * *